Figure 1:
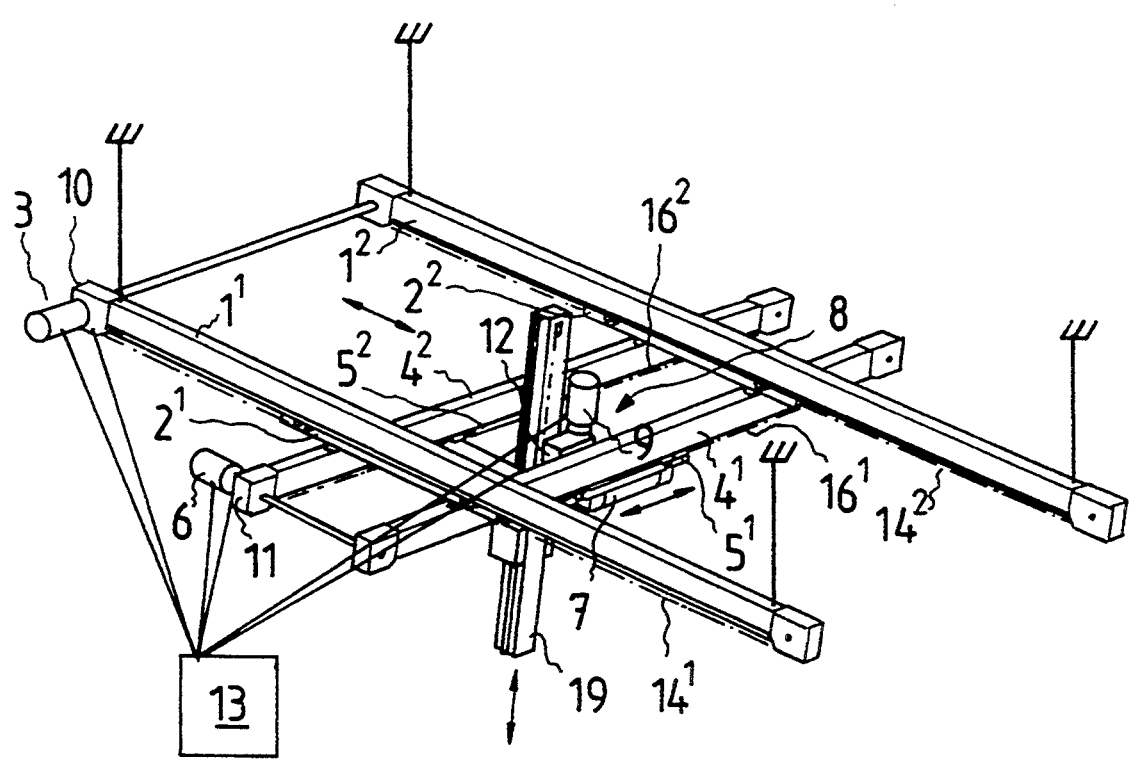

United States Patent [19]

Erikkilä

[11] Patent Number: 5,445,282

[45] Date of Patent: Aug. 29, 1995

[54] TRANSPORT MEANS FOR TRANSPORTING PIECES THREE-DIMENSIONALLY

[75] Inventor: Jouni Erikkilä, Espoo, Finland

[73] Assignee: Erikkila Ky, Espoo, Finland

[21] Appl. No.: 44,381

[22] Filed: Apr. 5, 1993

Related U.S. Application Data

[63] Continuation of Ser. No. 743,365, Aug. 19, 1991, abandoned.

[30] Foreign Application Priority Data

Feb. 17, 1989 [FI] Finland .................. 890788

[51] Int. Cl.$^6$ .................. B66C 17/00; B65G 25/04
[52] U.S. Cl. .................. 212/312; 198/748;
414/592; 414/749; 414/560; 901/16; 212/315;
212/322; 212/319
[58] Field of Search .................. 212/124–126,
212/128, 131, 205, 209–211, 213, 215–217;
414/2.66, 273–275, 279, 592, 560, 606, 618,
626–627, 737, 749; 294/64.1, 65; 901/9, 16, 21;
104/111; 187/20, 95; 198/748, 750

[56] References Cited

U.S. PATENT DOCUMENTS

| | | | |
|---|---|---|---|
| 2,983,390 | 5/1961 | Lang et al. .................. | 212/205 |
| 3,116,586 | 1/1964 | Inghem .................. | 212/125 |
| 3,280,759 | 10/1966 | Kayser et al. .................. | 104/162 |
| 3,777,908 | 12/1973 | Keller . | |
| 3,805,973 | 4/1974 | Thompson .................. | 414/284 |
| 3,973,683 | 8/1976 | Keller . | |
| 4,156,367 | 5/1979 | Pardo et al. .................. | 901/16 |
| 4,243,147 | 1/1981 | Twitchell et al. .................. | 212/221 |
| 4,378,872 | 4/1983 | Brown .................. | 198/570 |
| 4,838,438 | 6/1989 | Ishige et al. .................. | 212/205 |
| 5,051,055 | 9/1991 | Blatt et al. .................. | 414/627 |

FOREIGN PATENT DOCUMENTS

| | | | |
|---|---|---|---|
| 667100 | 7/1965 | Belgium .................. | 212/217 |
| 815371 | 6/1969 | Canada .................. | 414/279 |
| 0077085 | 4/1983 | European Pat. Off. . | |
| 0200694 | 12/1986 | European Pat. Off. . | |
| 2540087 | 8/1984 | France . | |
| 71054 | 6/1977 | Japan .................. | 901/16 |
| 342027 | 1/1972 | Sweden . | |
| 2120202 | 11/1983 | United Kingdom .................. | 901/16 |
| 8301797 | 5/1980 | WIPO .................. | 294/65 |
| 8605432 | 9/1986 | WIPO .................. | 901/16 |

*Primary Examiner*—Michael S. Huppert
*Assistant Examiner*—R. B. Johnson
*Attorney, Agent, or Firm*—Merchant & Gould, Smith, Edell, Welter & Schmidt

[57] ABSTRACT

A transport means for transporting pieces three-dimensionally, wherein the sections belonging to a section pair ($1^1$, $1^2$, $4^1$, $4^2$) are box-like; a traction member ($14^1$, $14^2$; $16^1$, $16^2$) has been disposed over its essential length inside the section ($1^1$, $1^2$; $4^1$, $4^2$) and secured to the carriage with a tension means (31); and the transport means comprises return sheaves (15; 17), which have been placed in pairs, spaced at the distance of the section, with the carriage ($2^1$, $2^2$; $5^1$, $5^2$) between the return sheaves; and the traction member has been disposed to run from the carriage over the return sheaves back to the respective carriage for forming a closed loop of the traction member and the respective carriage; and a power means (3, 6) has been arranged to move the traction member and by its mediation, the respective carriage.

2 Claims, 4 Drawing Sheets

TRANSPORT MEANS FOR TRANSPORTING PIECES THREE-DIMENSIONALLY

This is a continuation of application Ser. No. 07/743,365, filed Aug. 19, 1991 now abandoned.

The present invention concerns a transport means as defined in the preamble to claim 1.

In automation of industrial production and warehouses, various transport means are required which are able to meet various, and continuously changing, piece handling needs. The variables which impose the demand of flexibility on piece handling systems include variable series sizes, variable loads to be transported, and variation of piece sizes. In addition, comparatively high transporting and positioning accuracy is required of the piece handling systems. Transporting and positioning accuracy is understood to mean that the transport means will transport each piece, confirming accurately to the paths defined for it and will position itself so that the true position of the transport means is accurately consistent with the position defined for it.

In prior art transport means of robot type are known which are able to meet the needs that have been mentioned.

A problem associated with these means of prior art is that they are expensive in purchasing cost.

The robot-type means of prior art have the further drawback that only fairly small masses can be transported with them.

In prior art also transport means of bridge crane type are known. The transporting and positioning accuracy is poor in these means of prior art.

The object of the invention is to eliminate the above-mentioned drawbacks.

The transport means of the invention is characterized by that which is presented in claim 1.

The transport means of the invention for three-dimensional transporting of pieces comprises
a side-by-side, parallel and horizontal bridge section pair;
a bridge carriage pair, provided with a power means and installed to be carried by the bridge section pair, movably in the latter's direction;
a side-by-side, parallel and horizontal transport section pair, substantially perpendicular against the bridge section pair and installed to be carried by the bridge carriage pair;
a transport carriage pair, provided with a power means and installed to be carried by the transport section pair, movably in the latter's direction;
a lifting frame, installed to be carried by the transport carriage pair;
a lifting means, provided with a power means and installed on the lifting frame, movably in vertical direction; and
the carriage pair comprises an elongated traction member for moving the carriage. As taught by te invention, the sections belonging to one section pair are box-like; the traction member is disposed over its essential length inside the section and secured to the carriage with a tensioning means; and the transport means comprises return sheaves, placed in pairs with a spacing equivalent to the section, with the carriage between the return sheaves; and the traction member has been disposed to run from the carriage over the return sheaves back to the respective carriage to form a closed loop of the traction member and said carriage; and the power means has been disposed to move the traction means, and by its mediation the respective carriage. When the traction member constitutes a closed loop together with the bridge carriage and/or the transport carriage, it becomes possible by exerting action on the traction member from the power means, to move the bridge carriage reciprocatingly, carried by the bridge section and/or the transport section.

In an embodiment of the transport means, the traction member is a cog belt. The traction member may naturally equally be any other kind of elongated traction member known in the art, e.g. a chain, rope or the like. Using a cog belt in this connection is however advantageous because in that case when slipping whatsoever can occur between the return sheaves and the cog belt, and accurate transport motion is thus obtained. In addition, a cog belt drive is noiseless and requires little maintenance.

In an embodiment of the transport means, the bridge carriage comprises a roller assembly, disposed to travel inside the bridge section; and the bridge carriage has been installed to be suspended, and carried on the roller assembly.

In an embodiment of the transport means, the transport carriage comprises a roller assembly, disposed to travel inside the transport section; and the transport carriage has been installed to be suspended, and carried on the roller assembly.

When the roller assembly is travelling inside the section, a safe transport means is achieved of which the structures cannot become separated from each other under any circumstances whatsoever.

In an embodiment of the transport means, the power means is connected to a return sheave.

In an embodiment of the transport means, the transport means comprises a first pick-up for determining the position of the bridge carriages; a second pick-up for determining the position of the transport carriages; a third pick-up for determining the position of the lifting means; and a control means for processing the signals obtained from the pick-ups and controlling the movements of the transport means.

In an embodiment of the transport means, the first, second and third pick-ups are angle sensors, advantageously optical increment sensors, disposed to transmit signals to the control means. With the aid of the pick-ups, the control means is enabled to control accurately the motions of the transport means. The control means identifies with the aid of the pick-ups at any moment the three-dimensional position of the transport means and is thus enabled to control its motions in a pre-programmed way.

In an embodiment of the transport means, the lifting means comprises an upright beam, provided with mutually parallel guide rails affixed to opposite sides; the lifting frame comprises guide roller assemblies, and the guide rails and guide roller assemblies are so disposed that they guide, in cooperation, the vertical movement of the upright beam.

In an embodiment of the transport means, the guide roller assembly comprises two side wheels which rest against the guide rail on either side thereof; the axes of rotation of said side wheels are eccentric relative to their mounting axles, and when the mounting axles are rotated, adjustment of the clearance between the guide rail and the side wheels is enabled. Hereby the play between the guide rails of the upright beam and the side wheels can be adjusted to minimum, thus minimizing the undesirable lateral movements of the upright beam relative to the lifting frame.

In an embodiment of the transport means, the lifting means comprises a chain or equivalent, connected to and parallelling the upright beam; a traction wheel which connects with the chain by gear transmission; and a power means arranged to rotate the traction wheel.

In an embodiment of the transport means, the traction wheel is disposed at a distance from the upright beam, and the lifting means comprises deflection sheaves, disposed to deflect the chain to go to the traction wheel. An arrangement like this affords the possibility that the traction wheel need not be placed close to the upright beam, whereby space considerations cause no problems when the power means and transmission rations are being selected.

In an embodiment of the transport means, the power means is a squirrel cage motor.

In an embodiment of the transport means, the power means are squirrel cage motors controlled with the aid of frequency converters, for adjusting the speeds. It is advantageous in the transporting event to decelerate the velocities of the various motions of the transport means just before stopping, so that stopping might occur at the correct point with maximum accuracy.

In an embodiment of the transport means, the interior space of the upright beam and of the lifting frame constitutes a vacuum tank to back up the vacuum of the vacuum-operated action means. The action means may for instance be a vacuum-operated clamp, which needs for back-up, e.g. in the event of mains failure, a vacuum tank which makes sure that the clamp will not let go of the load unexpectedly and at the wrong moment. Using the interior space of the upright beam or of the lifting frame for vacuum tank is advantageous in view of producing a compact design in which no special, separate vacuum tank is needed, which would add to the weight of the structure and would complicate it. The action means connected with the transport means may, of course, be any kind of action means which is appropriate for the particular application.

The invention is based on the important observation that it is possible with a combination of standard crane components to produce a transport means transporting pieces three-dimensionally by which at the same time adequate transporting and positioning accuracy can be achieved. At the same time, its initial cost is a fraction of the initial cost of an equivalent piece handling robot of prior art.

The advantage offered by the invention is that a means enabling automatically produced lifting and transporting functions of comparatively large masses can be produced at favourable cost.

It is a further advantage of the invention that the transporting and positioning accuracy therewith achievable is high.

Furthermore, with the invention a transport means of simple construction is obtained and which is virtually maintenance-free.

In the following the invention is described in detail referring to the attached drawing, wherein FIG. 1 present a transport means according to an embodiment of the invention, viewed obliquely from above.

Figure 2:
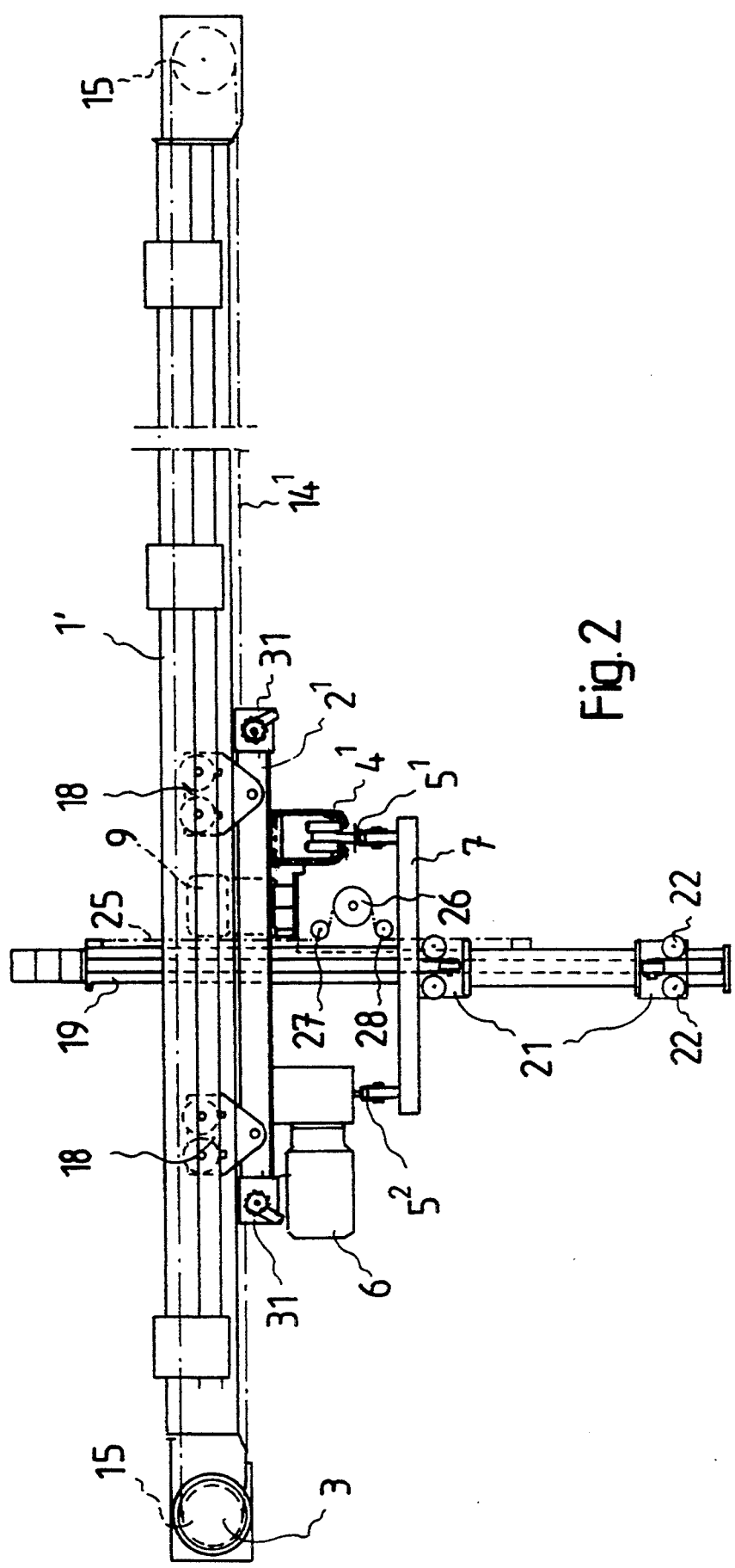
Figure 3:
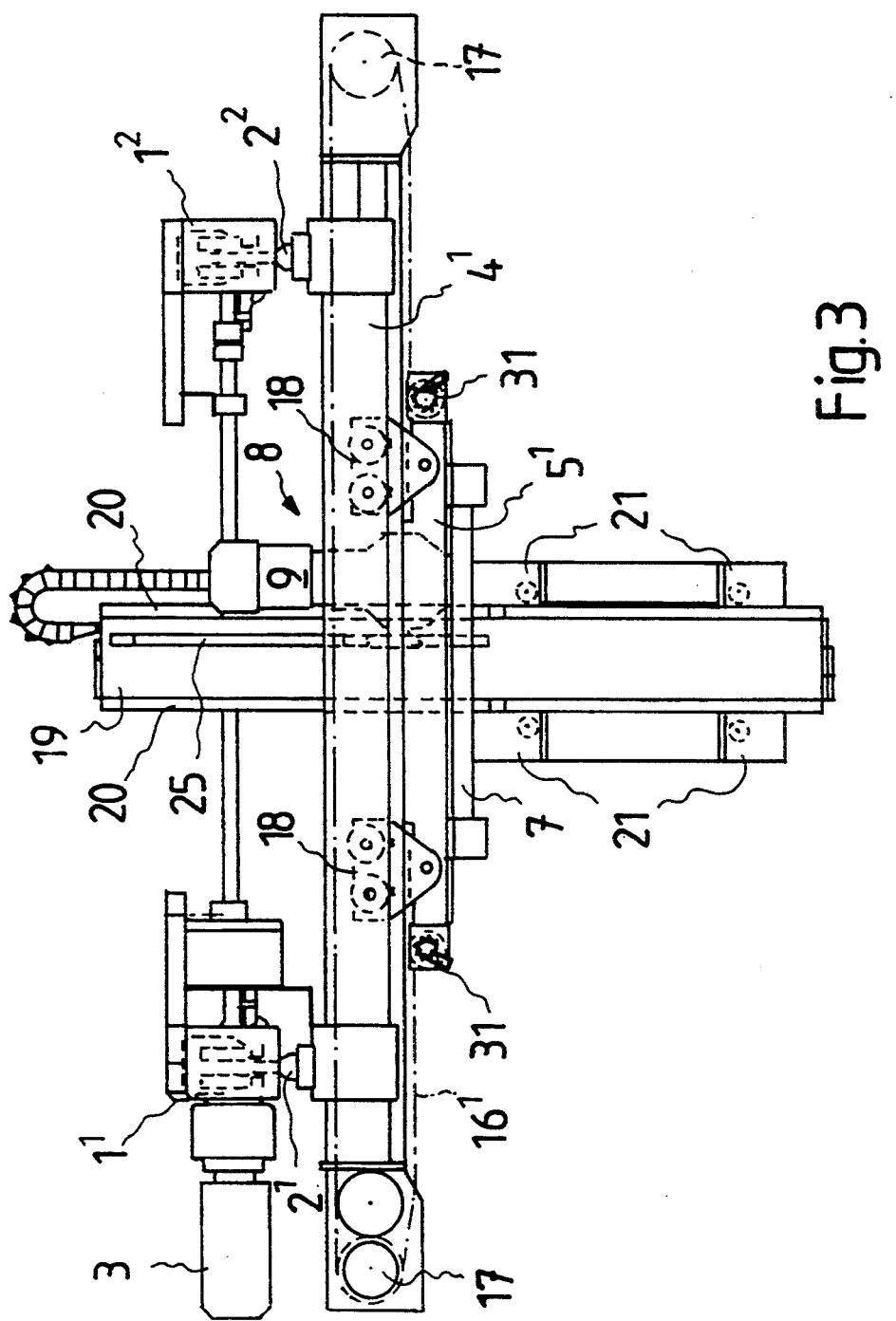
Figure 4:
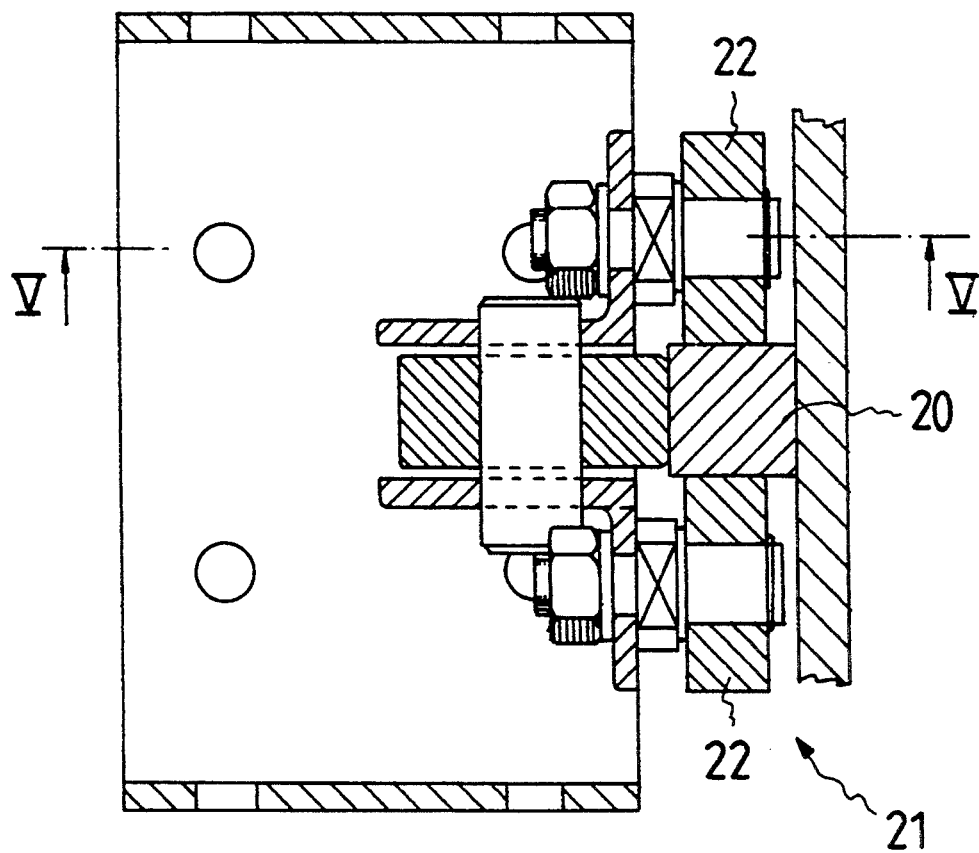
Figure 5:
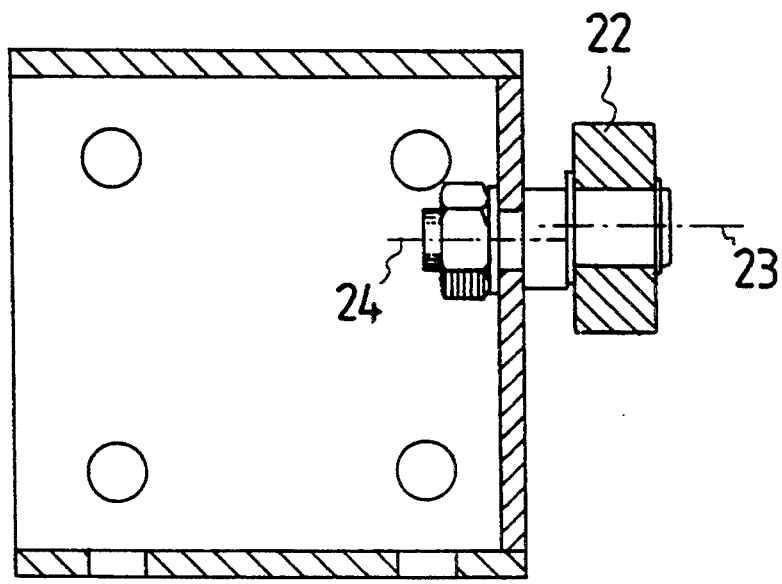

FIG. 2 presents a transport means according to another embodiment of the invention, in elevational view, FIG. 3 presents the transport means of FIG. 2, viewed from the front, FIG. 4 presents the guide roller assembly of the lifting means of a transport means according to a third embodiment of the invention, sectioned and in top view, and FIG. 5 shows the section V—V of FIG. 4.

In FIG. 1 is depicted a transport means for transporting pieces three-dimensionally. The transport means comprises two side-by-side, parallel and horizontal bridge sections $1^1$, $1^2$; two bridge carriages $2^1$, $2^2$ which are provided with a power means 3 and installed to be carried on the bridge sections $1^1$, $1^2$, movably in their direction; two transport section $4^1$, $4^2$ which are side-by-side, parallel and horizontal, substantially at right angles against the bridge sections $1^1$, $1^2$ and installed to be carried on the bridge carriages $2^1$, $2^2$; two transport carriages $5^1$, $5^2$ which are provided with a power means 6 and installed to be carried on the transport sections $4^1$, $4^2$, movably in their direction; a lifting frame 7 which is installed to be carried by the transport carriages $5^1$, $5^2$; a lifting means 8 which is provided with a power means 9 and mounted on the lifting frame, movable in the vertical direction; a first pick-up 10 for determining the position of the bridge carriages $2^1$, $2^2$; a second pick-up 11 for determining the position of the transport carriages $5^1$, $5^2$; a third pick-up 12 for determining the position of the lifting means 8; and a control means 13 for processing the signals from the pick-ups 10, 11 and 12 and for controlling the movements of the transport means.

In the embodiment of FIG. 2, presented in elevational view, can be seen the elongated traction member $14^1$, $14^2$ belonging to the bridge carriage $2^1$, $2^2$. The transport means further comprises two return sheaves 15, which have been spaced at the distance of the bridge section $1^1$, $1^2$, with the bridge carriage $2^1$, $2^2$ between the return sheaves 15. It also includes a power means 3 for moving the traction member $14^1$, $14^2$. The traction member has been disposed to run from the bridge carriage over the return sheaves and back to the bridge carriage. The traction member $14^2$ is seen, shown as a dotted line.

In the end view of FIG. 3 can be seen the elongated traction member $16^1$, $16^2$ belonging to the transport carriage $5^1$, $5^2$. The transport means further comprises two return sheaves 17, which have been spaced at the distance of the transport section $4^1$, $4^2$, the transport carriage $5^1$, $5^2$ being located between said return sheaves. Furthermore, it comprises a power means 6 for moving the traction member. The traction member runs from the transport carriage over the return sheaves and back to the transport carriage. The traction member $16^1$ is seen in the figure, depicted with a dot-and dash line.

The traction members $14^1$, $14^2$, $16^1$ and $16^2$ are cog belts which have been secured to the bridge and transport carriages $2^1$, $2^2$, $4^1$, $4^2$ with the aid of tensioning means 31.

The return sheaves 15, 17 are located on the ends of the bridge sections $1^1$, $1^2$ and of the transport sections $4^1$, $4^2$. The traction members $14^1$, $14^2$, $16^1$, $16^2$ have been disposed to run inside the sections. The power means 3 is connected to the return sheaves on one end of the bridge sections, which are interconnected by a transmission shaft. The power means 6 is likewise connected to the return sheave on one end of the transport section.

There may, of course, also be a specific power means for each return sheave on one end of the section.

The power means 3 and 6 may for instance be squirrel cage motors controlled with the aid of frequency converters, in which case the speed of rotation of the motors, and thus the velocities of the movements of the transport means can be controlled as desired, e.g. slightly before positioning, the velocity is dropped to a very low value, whereby high accuracy is achieved in stopping at a predetermined point.

The bridge carriages $2^1$, $2^2$ and the transport carriages $5^1$, $5^2$ comprise roller assemblies 18, which have been disposed to run inside the bridge sections $1^1$, $1^2$ and the transport sections $4^1$, $4^2$.

The lifting means 8 comprises an upright beam 19, provided with parallel guide rails 20 fixed on opposite sides, there being two such rails in this instance. The lifting frame 7 comprises guide roller assemblies 21, of which the number is four in the present instance. The guide rails 20 and guide roller assemblies 21 are so disposed that they guide, in cooperation, the vertical motion of the upright beam 19.

The lifting means 8 comprises a chain 25 or equivalent connected to the upright beam 19 and parallel to it. The traction wheel 26 belonging to the lifting means is connected with the chain by a gear transmission. The power means 9 has been disposed to drive the traction wheel. The power means is advantageously a squirrel cage motor.

The traction wheel 26 is disposed at a distance from the upright beam 19, and the lifting means comprises traversing wheels 27 and 28, disposed to deflect the chain 25 to the traction wheel.

The interior spaces of the upright beam 19 and of the lifting frame 7 constitute a vacuum tank for backing up the vacuum of the vacuum-operated action means 30.

The first 10, second 11 and third pick-up 12 are pulse transmitters, advantageously optical increment transmitters, arranged to transmit signals to the control means 13.

The guide roller assembly 21, depicted in FIGS. 4 and 5, comprises two side wheels 22 resting against the guide rail 20, on either side thereof. The rotation axles 23 of the side wheels are eccentrically offset relative to their mounting axles 24. By rotating the mounting axles 24, the clearance play between the guide rail 20 and the side wheels 22 can be adjusted.

The invention is not delimited merely to concern the embodiment examples presented in the foregoing: numerous modifications thereof are feasible without departing from the scope of the inventive idea defined by the claims.

I claim:

1. A transport means for transporting objects, comprising:
   a pair of side-by-side parallel and horizontal bridge sections, said bridge sections being of a box-type configuration;
   a pair of bridge carriages including first power means connected thereto for movement thereof, said bridge carriages being carried by said bridge sections and movable thereon;
   a pair of side-by-side parallel and horizontal transport sections being substantially at right angles with respect to said pair of bridge sections, said transport sections being carried by said pair of bridge carriages, said transport sections having a box-type configuration;
   a pair of transport carriages having second power means connected thereto for movement thereof, said transport carriages being mounted on said pair of transport sections and being movable thereon;
   a lifting frame carried by said transport carriages;
   a lifting means for lifting objects including third power means, said lifting means being mounted on said lifting frame for vertically moving objects;
   an elongated traction member mounted on each of said bridge sections and operatively connected to said bridge carriages for moving said transport sections and an elongated traction member mounted on each of said transport sections and connected to said transport carriages for moving each transport carriage and the lifting frame, a respective elongated traction member being disposed along a substantial part of a respective length of said transport and bridge sections;
   return sheaves placed in pairs on each of said bridge sections and each of said transport sections at a fixed spacing;
   said first and second power means being respectively connected to one of said pairs of return sheaves to move said traction member and in response thereto, their respective bridge and transport carriages;
   tension adjusting means mounted on each of said bridge and transport carriages, intermediate said return sheaves, for adjusting the tension of the respective elongated traction members; and
   each traction member extending from said tension adjusting means over said pair of return sheaves and being operatively connected to a respective bridge and transport carriage such that each traction member forms a separate loop.

2. A transport means according to claim 1 wherein said lifting means includes an upright beam provided with a pair of parallel guide rails to guide the vertical movement of said beam when an object is raised or lowered.

* * * * *

UNITED STATES PATENT AND TRADEMARK OFFICE
CERTIFICATE OF CORRECTION

PATENT NO. : 5,445,282

DATED : August 29, 1995

INVENTOR(S) : Jouni Erikkilä

It is certified that error appears in the above-identified patent and that said Letters Patent is hereby corrected as shown below:

In column 1, line 58, "te" should be --the--.

In column 3, line 64, "present" should be --presents--.

In column 4, line 43, "$14^2$" should be --$14^1$--.

Signed and Sealed this

Second Day of January, 1996

*Attest:*

BRUCE LEHMAN

*Attesting Officer*  Commissioner of Patents and Trademarks